UNITED STATES PATENT OFFICE.

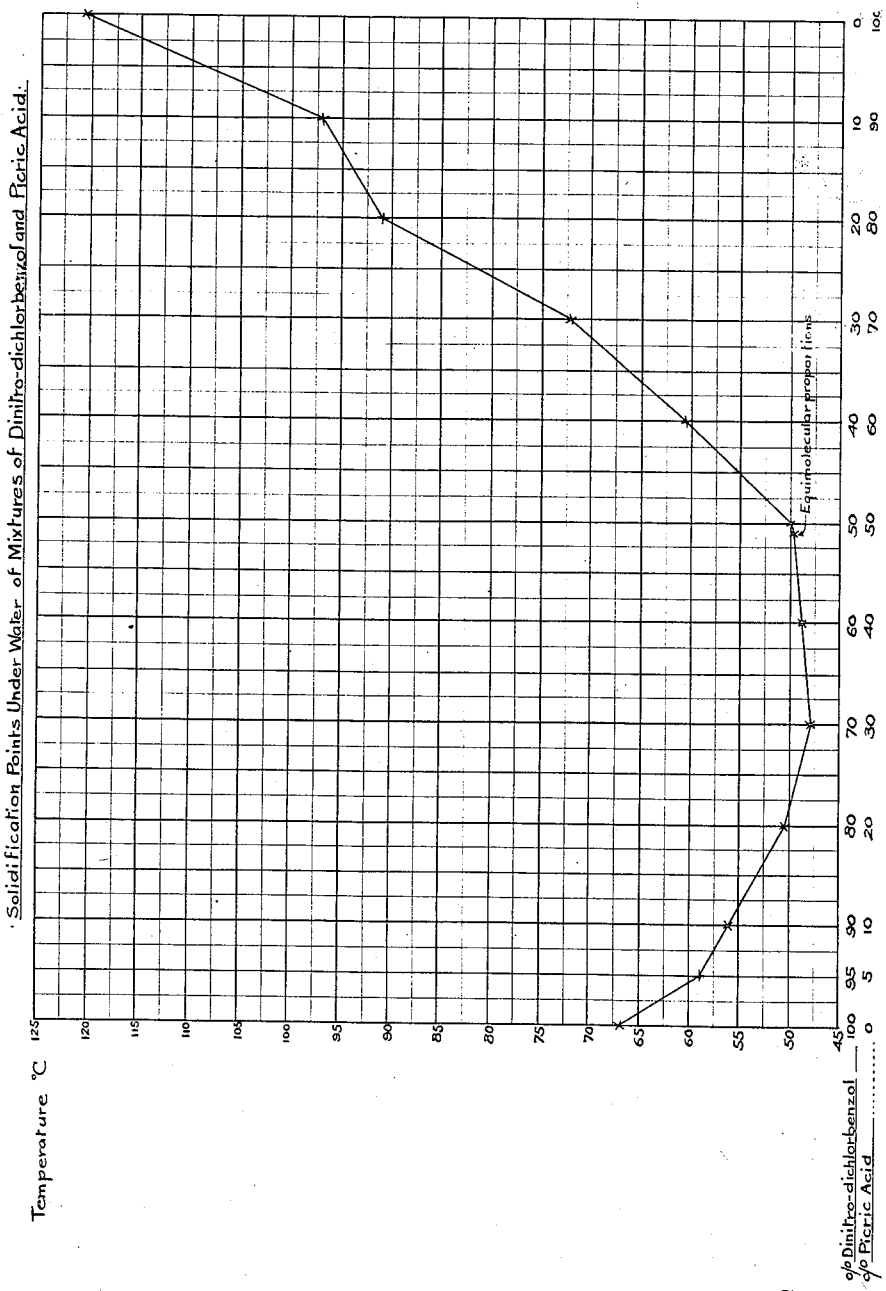

JESSE H. BABCOCK, OF NIAGARA FALLS, NEW YORK, ASSIGNOR TO HOOKER ELECTROCHEMICAL COMPANY, OF NEW YORK, N. Y., A CORPORATION OF NEW YORK.

EXPLOSIVE AND METHOD OF MAKING SAME.

1,366,048.

Specification of Letters Patent.  Patented Jan. 18, 1921.

Application filed May 9, 1918. Serial No. 233,484.

*To all whom it may concern:*

Be it known that I, JESSE H. BABCOCK, a citizen of the United States, residing at Niagara Falls, in the county of Niagara and State of New York, have invented certain new and useful Improvements in Explosives and Methods of Making Same, of which the following is a specification.

This invention relates to a novel explosive, or explosive composition, and to the method of preparing the same.

I have discovered that an explosive having certain highly desirable characteristics for military purposes may be very simply and easily prepared by the direct nitration, under suitable conditions, of the mixture of isomeric di-chlorbenzols which constitute the major portion of the high boiling residue remaining after the treatment of benzol with chlorin, usually in presence of iron or ferric chlorid as a catalyzer, and the removal by distillation of the mono-chlorbenzol and unchlorinated benzol. The residual material, after the mono-chlorbenzol has been substantially eliminated, may be subjected to steam distillation; and the portion which crystallizes on cooling from the distillate serves as the raw material for the preparation of my novel product. This crystalline material consists largely of para-dichlorbenzol, together with a comparatively small proportion of ortho-dichlorbenzol. Meta-dichlorbenzol may perhaps be present in minor proportions. The material which crystallizes from the distillate is probably essentially a solid solution of para-dichlorbenzol in ortho-dichlorbenzol, and is preferably thoroughly drained or otherwise dried to eliminate liquid components as far as practicable. The preponderating and essential component of the raw material, which I subject to nitration is, therefore, para-dichlorbenzol.

The nitration is preferably carried out substantially as follows. The nitrating acid may comprise:

$H_2SO_4$ ---------------------- 73.5%
$HNO_3$ ---------------------- 25.0%
$H_2O$ ---------------------- 1.5%

I prefer to employ 2½ to 3 molecules of nitric acid for each molecule of the di-chlorbenzol. The nitrating acid is preferably heated to 60–65° C, and the di-chlor body is introduced slowly, either as a solid or in molten state. The temperature is raised gradually to 100–105° C. and is preferably maintained at the maximum point for about two hours. The entire operation is readily performed in twelve hours or less.

After separating the nitrated product from the spent acid, the former is washed thoroughly with hot water, and is then recrystallized from alcohol. It is thereby so far purified as to withstand successfully the so-called KI (stability) test.

The resulting di-nitro body may be detonated, and is therefore capable of being used directly as an explosive. In order to increase the power and completeness of the explosion I prefer to use it in any of the following ways, or any combinations of them:—

1. The di-nitro body is used in conjunction with a suitable "booster." For this purpose I prefer to use about 2% more or less of tetryl (tetra-nitro-methyl-anilin), although other powerful explosives, such as the tri-nitro aromatic bodies (T. N. T., picric acid, etc.,) may be substituted wholly or in part for the tetryl. It is of course understood that in the use of a booster the latter is segregated from the mass of the di-nitro body, the detonator being embedded in the booster.

2. The di-nitro body is incorporated in a homogeneous melt with picric acid or other explosive having a higher melting point. The di-nitro body prepared in the manner described above melts between 65° and 85° C., the bulk of the material melting at about 70° C. In the molten condition it is an excellent solvent for picric acid.

The accompanying drawing is a curve indicating the solidification points, under water, of homogeneous mixtures of picric acid with varying proportions of the di-nitro body. The proper pouring temperatures of the corresponding mixtures may be roughly estimated as about 5° C. above the respective solidification points. The melting points of the mixtures throughout a very wide range are such as readily to permit melting the same by steam heat and casting into the shell or container: and the solvent power of the melted di-nitro body for picric acid is such that a homogeneous product or solid solution is obtainable throughout this range. The resulting products may be detonated directly or by means of a tetryl or other booster, as described above.

3. The di-nitro body may be used in conjunction with suitable oxygen-supplying compounds, such as ammonium nitrate, etc: or mixtures of the di-nitro body and such oxygen-supplying compounds may be used with a booster in the manner specified above.

It is characteristic of the di-nitro body that the gases and fumes given off by its explosion are of an exceedingly disagreeable and dangerous character. While the composition of these fumes may vary materially under different conditions of use, they are believed to consist largely of hydrochloric acid and the vapors of the di-nitro body itself. The latter in particular are exceedingly painful in their effect on the eyes and skin.

I claim:—

1. An explosive containing dinitro-para- and ortho-dichlorbenzol, the former in preponderating proportion, said explosive melting at 65–85° C., and existing at lower temperatures in the form of a solid crystalline body, capable of withstanding the KI test.

2. An explosive comprising a homogeneous solid solution of a tri-nitro aromatic body in dinitro-dichlorbenzol.

3. An explosive comprising a homogeneous solid solution of picric acid in dinitro-dichlorbenzol.

4. An explosive comprising a homogeneous solid solution of a tri-nitro aromatic body in a mixture of dinitro-para- and ortho-dichlorbenzol.

5. An explosive comprising a homogeneous solid solution of picric acid in a mixture of dinitro-para- and ortho-dichlorbenzol.

In testimony whereof, I affix my signature.

JESSE H. BABCOCK.